(12) United States Patent
Gold

(10) Patent No.: US 9,037,649 B2
(45) Date of Patent: May 19, 2015

(54) SELECTING AND SHARING PERSONAL USER INFORMATION ASSOCIATED WITH A USER EQUIPMENT

(75) Inventor: Richard Gold, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 27 days.

(21) Appl. No.: 13/321,963

(22) PCT Filed: May 29, 2009

(86) PCT No.: PCT/SE2009/050633
§ 371 (c)(1),
(2), (4) Date: Nov. 22, 2011

(87) PCT Pub. No.: WO2010/138044
PCT Pub. Date: Dec. 2, 2010

(65) Prior Publication Data
US 2012/0089679 A1   Apr. 12, 2012

(51) Int. Cl.
G06F 15/16    (2006.01)
G06F 17/30    (2006.01)
H04W 4/20     (2009.01)
H04L 29/06    (2006.01)

(52) U.S. Cl.
CPC ......... *G06F 17/30867* (2013.01); *H04W 4/206* (2013.01); *H04L 63/0407* (2013.01); *H04L 63/168* (2013.01)

(58) Field of Classification Search
CPC . H04L 63/168; H04L 63/0497; H04W 4/206; G06F 17/30867
USPC .................... 709/206, 227; 719/313; 455/466
See application file for complete search history.

(56) References Cited

U.S. PATENT DOCUMENTS

| | | | |
|---|---|---|---|
| 7,310,515 B2 | 12/2007 | Enderlein et al. | |
| 2003/0004782 A1 | 1/2003 | Kronby | |
| 2006/0168006 A1* | 7/2006 | Shannon et al. | 709/206 |
| 2008/0052288 A1 | 2/2008 | Flinn et al. | |
| 2008/0155644 A1 | 6/2008 | Baranov et al. | |
| 2009/0054092 A1* | 2/2009 | Stonefield et al. | 455/466 |
| 2009/0125521 A1 | 5/2009 | Petty | |

(Continued)

FOREIGN PATENT DOCUMENTS

| | | |
|---|---|---|
| EP | 1 734 635 A2 | 12/2006 |
| WO | WO 03/087992 A2 | 10/2003 |
| WO | WO 2009/016525 A1 | 2/2009 |

OTHER PUBLICATIONS

International Search Report, PCT/SE2009/050633, Jan. 28, 2010.
Written Opinion of the International Searching Authority, PCT/SE2009/050633, Jan. 28, 2010.

(Continued)

*Primary Examiner* — Larry Donaghue
(74) *Attorney, Agent, or Firm* — Myers Bigel Sibley & Sajovec, P.A.

(57) ABSTRACT

A method, user equipment and computer program for of selecting and sharing personal user information associated with the user equipment. The method is performed by the user equipment and comprises the steps of: establishing communication with a responding user equipment; selecting a subset of the personal user information, as a function of a history record of a previous exchange of personal user information between the user equipment and the responding user equipment; and transmitting the subset of the personal user information to the responding user equipment.

18 Claims, 2 Drawing Sheets

(56) References Cited

U.S. PATENT DOCUMENTS

2009/0150400 A1* 6/2009 Abu-Hakima et al. ......... 707/10
2009/0287920 A1* 11/2009 Fernandez et al. ............ 713/151
2010/0192072 A1* 7/2010 Spataro et al. ................ 715/753

OTHER PUBLICATIONS

International Preliminary Report on Patentability, PCT/SE2009/050633, May 12, 2011.
Extended European Search Report, Application No. 09845316.0-1507.

* cited by examiner

SELECTING AND SHARING PERSONAL USER INFORMATION ASSOCIATED WITH A USER EQUIPMENT

CROSS REFERENCE TO RELATED APPLICATION

This application is a 35 U.S.C. §371 national stage application of PCT International Application No. PCT/SE2009/050633, filed on 29 May 2009, the disclosure and content of which is incorporated by reference herein in its entirety. The above-referenced PCT International Application was published in the English language as International Publication No. WO 2010/138044 A1 on 2 Dec. 2010.

TECHNICAL FIELD

The invention relates to a method, user equipment, computer program and computer program product for selecting and sharing personal user information associated with a user equipment.

BACKGROUND ART

Social networking or social network services are today used for the building of online communities through the usage of web-based applications which have recently shown to be quite successful in terms of a steadily increasing number of users. However, one major issue concerning social networking is the matter of privacy, as users are often reluctant to reveal personal information on the Internet when it is felt that the privacy controls are not sufficiently strong or flexible or when there is a perception that the user is not in control of their own personal data. This reluctance tends to become stronger when the personal information contains information about a user's physical condition or location. Pseudonymity (a fictitious and often anonymous identity) is commonly used on the Internet to provide privacy controls but is challenging in a social network service setting where typically a user wishes to know the real-world identity of a person he or she is communicating with.

The personal information people often are reactant to share with remote or un-known persons include, for example, a so called social network profile in the form of a list of descriptive information about the user, social connections that describe a persons relations with other users, information about membership in Internet forums, communities and groups etc.

Examples of social networks that facilitate communication between persons include Facebook, Orkut, LinkedIn, Plaxo, Cyworld, Mixi, QQ and MySpace. Each of these applications applies various models for handling personal/private information, such as i) the "open model", where all members of the social network can see all information about a user, ii) the "friend model", where all friends of a user can see all personal information about a user, while non-friends see restricted amounts of information, and iii) the "granular model", where certain friends can see certain information about a user at that user's discretion, while "non-friends" see restricted amounts of information. In this context the granular model can be seen as an improved version of the friend model in terms of allowing a user to define what information shall be revealed to other persons, which often is implemented by allowing a user to provide each friend with a particular set of information access rights, while non-friends by default can only see restricted or no information. Privacy control is often implemented by using access control to prevent unauthorized people gaining access to the data. Encryption to protect data in transit is also used and sometimes the amount of available personal data is minimized.

The level of desired privacy is often a matter of trust which tends to be implemented as a rather static setting in the social networking service, as indicated by the above described models for handling personal information. By increasing trust the level of anonymity in the social networking service may be decreased, thus making more personal information available to more trusted users. Moreover, for establishing trust (making more information available) it is also relevant to allow a person to meet the "right person" in the social network, i.e. a person whom one shares common interests and values.

An example of a known technique that relates to increasing trust and thus at least indirectly reduce the need of anonymity is described in US-2003/0004782 A1, where an apparatus automates the process of determining whether individuals in social groups have positive or negative responses to each other, and automates the process of notifying the people involved of such responses. The apparatus receives inputs from participants who have engaged in a group social event indicating the positive and negative responses they have toward each other. Next, searches are done for mutual positive responses and for other patterns of response that provide valuable feedback to the participants, such as which participant received the most positive responses overall. The system then reveals this information to the participants and allows the participants who matched with each other to communicate privately.

Another example of a technique for matching people with mutual interest is disclosed in US-2008/0052288 A1, where a system uses a mutual commit process for automatically matching people. The process includes a recommender system that generates people recommendations based on inferences of preferences derived from system usage behaviors. The process also includes variations of a mutual commitment process that may only reveal a first person's interest in making their expression of interest with a second person if a reciprocal interest in revealing expression of interest is indicated. By doing so, potential embarrassment and fear of rejection can be reduced, i.e. the risk of identifying the "wrong person" is reduced by the system.

Though the technologies described above may assist in investigating whether two users are matching, and thereby potentially increase trust between the users and accordingly reduce the need of anonymity, they are limited to rather static matches where users either "match" or "do not match".

SUMMARY

In view of the foregoing, it is an object of the invention to provide an improvement of the above techniques and prior art. More particularly, it is an object to provide an at least partly automated technique allowing users to gradually increase trust and reduce the need of anonymity.

Hence a method is provided for selecting and sharing personal user information associated with a user equipment. The method is performed in the user equipment and comprises the steps of: establishing communication with a responding user equipment; selecting a subset of the personal user information, as a function of a history record of a previous exchange of personal user information between the user equipment and the responding user equipment; and transmitting the subset of the personal user information to the responding user equipment.

The personal user information is typically any information related to a user of the user equipment, but is typically information relating to any values, ongoing projects and interests of the user such as a favorite band, favorite book, computer game or movie, book that the user is currently reading, a job-position, social status, religious and political views, presence information etc. The personal user information can also represent physical entities like a place/region of living/postal address, a place to visit, a travelling direction an so on. The personal user information could also be a portrait/picture of the user or any data about the physical appearance of the user, such as sex and hair color. The responding user equipment is another (a second) user equipment that is capable of communicating with the inventive (the first) user equipment.

Generally, the responding user equipment implements functionality similar to the inventive user equipment, i.e. both the user equipment in which the method is performed and the responding user equipment are user equipment according to the invention, even if this is not necessary.

A subset of the personal user information can be e.g. a set of characters forming a word such as the name of a favorite book of the user, but may also be a number of words representing more comprehensive personal user information. However, the subset of personal user information is not the complete personal user information associated with the user equipment but a selection thereof.

The history record comprises data about any earlier exchange of personal user information between the user equipment and the responding user equipment, which includes personal user information of the user equipment sent to the responding user equipment and/or vice versa, i.e. personal user information of the second, responding user equipment sent to the first user equipment.

An advantage with the invention lies in a possibility to avoid revealing the true identity of a person to which the personal information belongs, since establishing communication and transmission of information does not necessarily require revealing of the true identity.

The history record may comprise information about a previous transmission, from the responding user equipment to the user equipment, of personal user information associated with the responding user equipment. Such information about a previous transmission includes, for example, from and to which user equipment the transmission was done, when it was done, how frequent information is transmitted, the content of the transmission and so on.

The history record may comprise information about an amount of personal user information previously transmitted from the responding user equipment to the user equipment and associated with the responding user equipment.

This amount is typically an amount of data, a number of transmissions over a period of time, a rate of a data stream etc. Accordingly, this can e.g. facilitate for more information being sent to the responding user equipment, if the responding user equipment previously responded by revealing more information about the user of the responding user equipment.

The history record may comprise information about a type of personal user information previously transmitted from the responding user equipment to the user equipment and associated with the responding user equipment. Some examples of "a type of personal information" can include information categories like "film", "music", "favorite game", "hobbies", "sports", "social status" (e.g. married and un-married), and a value indicating the personal choice assigned to the category. By taking the type of personal user information into account it is possible to e.g. increase the revealing of information when users share common interests.

A selectable set of personal user information may be increased when the history record indicates an increase of personal user information mutually exchanged between the user equipment and the responding user equipment. This is advantageous in that information may in an automated manner be selectively and gradually revealed to another user on basis on personal information previously revealed. The result is an automated method that mimics the behavior of real persons that meet face-to-face, where personal information is gradually exchanged on basis of the communication between the persons. Accordingly, the result of the invention is a simulation of a real-life, person-to-person communication situation, where trust (information exchange) may be increased. Of course, the trust may be decreased as well in dependence of the exchange of user information.

It should here be understood that "A selectable set of personal user information" is a part of the personal user information that is available for the selecting of the subset of the personal user information.

The selecting of the subset of the personal user information may comprise randomly selecting at least a part of the subset of the personal user information, i.e. at least a part of the personal user information is randomly selected and is then comprised in the subset of personal user information to be transmitted to the responding user equipment. By selecting information randomly, privacy is generally increased as it is not possible for a responding user to search for linked parts of personal information that in cooperation reveals relatively more about the user.

The randomly selected part of the subset of personal user information may be decreased as a function of the history record. By decreasing the randomly selected parts of information a more complete picture of the user may be given, which indicates and simulates increased trust.

The selecting of the subset of the personal user information may comprise selecting at least a part of the subset as a function of a privacy-classification of the personal user information. This means that at least a part of the personal user information is selected as a function of a privacy-classification and is then comprised in the subset of personal user information to be transmitted to the responding user equipment.

The privacy-classification is generally an indication of which personal user information that may be revealed, and can depend on a setting made by a user of the user equipment. For example, the classification can be "reveal" or "hide" information, in dependence of an amount of information previously exchanged between the users. The privacy-classification can be associated with the type of personal user information described above, such that information about e.g. books and films can be revealed, while information about some other types of personal information is not revealed until more information has been exchanged between the users.

It is also possible to implement a general privacy classification that affects all or substantially all personal user information. In practice the general privacy classification can be implemented by allowing a user to set a value of a general variable that affects each piece of user information.

The selecting of the subset of the personal user information may comprise randomly selecting at least a part of the subset as a function of a type-classification of the personal user information, which means that at least a part of the personal user information is selected as a function of the type-classification and is then comprised in the subset of transmitted personal user information.

This type-classification can be similar with the above described type of personal user information, i.e. the type-classification can indicate a category (films, book, hobbies and so on) to which the information belongs, and is particularly useful if it is desired to reveal e.g. information that may be blocked by a "hide"-setting of the privacy-classification mentioned above. This means that selecting personal user information according to a privacy-classification may be over-ridden by randomly selecting a part of the personal user information to be included in the selected subset.

The personal user information associated with the user equipment may be stored in the user equipment, or more particularly, may be stored in a memory arranged on the user equipment.

The method may comprise generating a temporary and/or random identifier of the user equipment, which is advantageous in that anonymity can be increased, for example when initial trust between two users is low.

The transmitting of the subset of the personal user information may comprise transmitting an identifier of the user equipment to the responding user equipment, such that e.g. a response from the responding user equipment may be recognized by including the identifier in the response. Hence, the transmitted identifier may be associated with the transmitted subset of personal user information.

The method may comprise receiving a response from the receiving user equipment, the response comprising a set of personal user information associated with the receiving user equipment and the transmitted identifier.

The method may comprise presenting on the user equipment the subset of the personal user information, and receiving a user input indicating parts of the subset of the personal user information to be transmitted to the responding user equipment. This provides for a man-machine interface where an otherwise fully automated method for exchanging personal user information can be partially or even fully controlled by the user, who accordingly can take into account his personal sense of trust in the user of the responding user equipment before transmitting the information. This can be done, for example, by selecting which parts of the subset of user information to be really transmitted, i.e. the user makes a manual selection of a subset of the automatically selected subset of the personal user information. Thus, if the user does not select the full subset of the personal user information, only a part of the subset of the personal user information that was selected as a function of the history record is transmitted to the responding user equipment.

According to another aspect of the invention, a user equipment is provided and is configured to select and share personal user information associated with the user equipment. The user equipment comprises: means for establishing communication with a responding user equipment; means for selecting a subset of the personal user information, as a function of a history record of a previous exchange of personal user information between the user equipment and the responding user equipment; and means for transmitting the subset of the personal user information to the responding user equipment. More particularly, the user equipment can be a mobile user equipment for wireless communication via at least one long range and one short range communication interface, such as a laptop or a cellular phone.

For the user equipment, the history record may comprise the same information as for the history record described in connection with the method.

The selectable set of personal user information may, for the user equipment, be increased in the same manner as for the method, and the means for selecting of the subset of the personal user information may be configured to i) randomly select at least a part of the subset of the personal user information, ii) select at least a part of the subset as a function of a privacy-classification of the personal user information, and/ or iii) randomly select at least a part of the subset as a function of a type-classification of the personal user information. The means for selecting may also be configured such that the randomly selected part of the subset of personal user information may be decreased as a function of the history record.

The user equipment may comprise means for storing the personal user information associated with the user equipment, and/or means for generating a temporary and/or a random identifier of the user equipment.

The means for transmitting may be configured to transmit an identifier of the user equipment to the responding user equipment, and the transmitted identifier may be associated with the transmitted subset of personal user information.

The user equipment may comprise means for receiving a response from the receiving user equipment, where the response comprises a set of personal user information associated with the receiving user equipment and the transmitted identifier. The user equipment may also comprise means for presenting on the user equipment the subset of the personal user information, and means for receiving a user input indicating parts of the subset of the personal user information to be actually transmitted the responding user equipment.

According to yet another aspect of the invention, a computer program is provided for selecting and sharing personal user information associated with a user equipment. The computer program comprises code means which when run on the user equipment causes the user equipment to: establish communication with a responding user equipment; select a subset of the personal user information, as a function of a history record of a previous exchange of personal user information between the user equipment and the responding user equipment; and transmit the subset of the personal user information to the responding user equipment.

According to still another aspect of the invention, a computer program product is provided, comprising a computer readable means and a computer program as described above and stored on the computer readable means.

The inventive computer program may comprise code means which when run on a the user equipment causes the user equipment to perform any of the features described above in association with the inventive method, and shares the corresponding advantages. In a similar manner the various means of the user equipment have the same advantages as the corresponding functionality of the inventive method.

BRIEF DESCRIPTION OF THE DRAWINGS

Embodiments of the invention will now be described, by way of example, with reference to the accompanying schematic drawings, in which.

DETAILED DESCRIPTION

A basic concept described herein includes creating a social network that incorporates graduated pseudonymity. Graduated pseudonymity can be seen as having many layers of pseudonymity which progressively reveal more or less about a user. Instead of focusing on present social network features such as profiles, interactions between users that do not necessarily require real-world identities and that can even be performed anonymously are analyzed. This approach employs the understanding that users wish to ask questions about other users preferences which are not predicated on a real-world identity. It can also often be assumed that a user wishes to ask a question to other users in his vicinity. At the same time the user often prefers to i) preserve his privacy by not necessarily revealing his true identity by simply asking a question, ii) potentially communicate individually with specific respondents to his question, and iii) potentially selectively reveal information to the respondents based on his own judgment.

Equipment used for selecting and sharing information forming questions and answers can use a new pseudonym for each session (transaction) of information exchange. A transaction typically takes the form of either a question or an answer to a question. A sample question may be "which bands do you like?". This question can be sent using a short-range wireless technology such as Zigbee, ULPW (Ultra Low Power Wifi) or ULPB (Ultra Low Power Bluetooth), or can be sent to a central relay server over a cellular network.

Software implemented for supporting the transactions can, for example, generate a cryptographically secure random pseudonym which is used to identify the question and thereby allow the responses of other users to also be identified, by including the random pseudonym in the answer. If a user wishes to respond to a question, a randomly-generated pseudonym can be generated to identify the replier. Typically a user replies with a randomized subset of his actual user information to prevent easy identification of the user. If two users wish to continue communication, the pseudonyms generated for the respective user can be re-used. This enables communication between users but still preserves a certain amount of privacy as there is no easily discernible connection between the pseudonyms and the real-world identities of the users.

As communication continues over time the communicating users can, with help from the UEs, selectively and mutually reveal more and more information as trust between the users increases. This selective revealing of information can be achieved by gradually increasing the amount of information that is allowed to be revealed, which can be implemented as decreasing the amount of randomness used when the UE selects information that can be transmitted.

Figure 1:
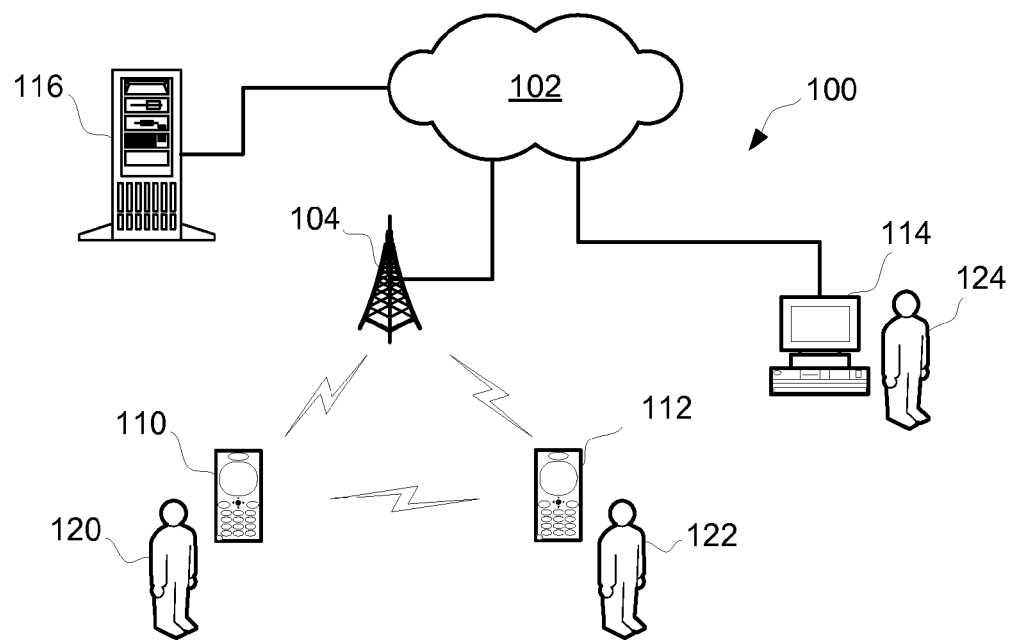
FIG. 1 illustrates a communication system with user equipments according to an embodiment of the invention.

With reference to FIG. 1, a first UE 110, a second (responding) UE 112 and a third UE 114 configured to perform the above described transactions are illustrated. In this embodiment, the first UE 110 and the second UE 112 each implements the below described method for selecting and transmitting personal user information. The UEs 110, 112, 114 are part of a communication system 100 which comprises a network 102 that is implemented as, or include, for example a WAN (Wide Area Network), a LAN (Local Area Network), the Public Switched Telephone Network, the Internet, and one or more intranets. Each of the UEs are associated with a respective user 120, 122, 124 via any of a respective IMEI (International Mobile Equipment Identity) of the UE, the IMSI (International Mobile Subscriber Identity) of a SIM-card (Subscriber Identity Module card) in the UE, a URI (Uniform Resource Identifier) or a an IP-address (Internet Protocol address) associated with the UE.

As illustrated, some of the UEs are cellular equipments, here the first and the second UEs 110, 112, which each includes a respective wireless short range communication interface like Bluetooth or one of the IEEE 802 wireless communication protocols that facilitates direct communication between the UEs 110, 112. The UE 114 is in turn a personal computer. A number of mobile base stations of which one 104 is shown are included in the communications system 100 to support long-range, wireless communication.

The base station 104 facilitates, in a manner known within the art, wireless communication between the cellular UEs 110, 112 and communication between the UEs 110, 112 and the network 102 and a relay server 116 connected to the network 102.

The base station 104 is configured to support communication via voice, video, text, and/or any combination thereof, and is implemented as a conventional base station in a GSM (Global System for Mobile communications), TDMA (Time Division Multiple Access), CDMA (Code Division Multiple Access), or W-CDMA (Wideband Code Division Multiple Access) network, or as a eNodeB within a network like the LTE (Long Term Evolution) network specified by 3rd Generation Partnership Project (3GPP) Release 8. The base station 104 can also be implemented as an IEEE 802.XX-type access point, e.g. a IEEE 802.16-compatible access point.

Figure 2:
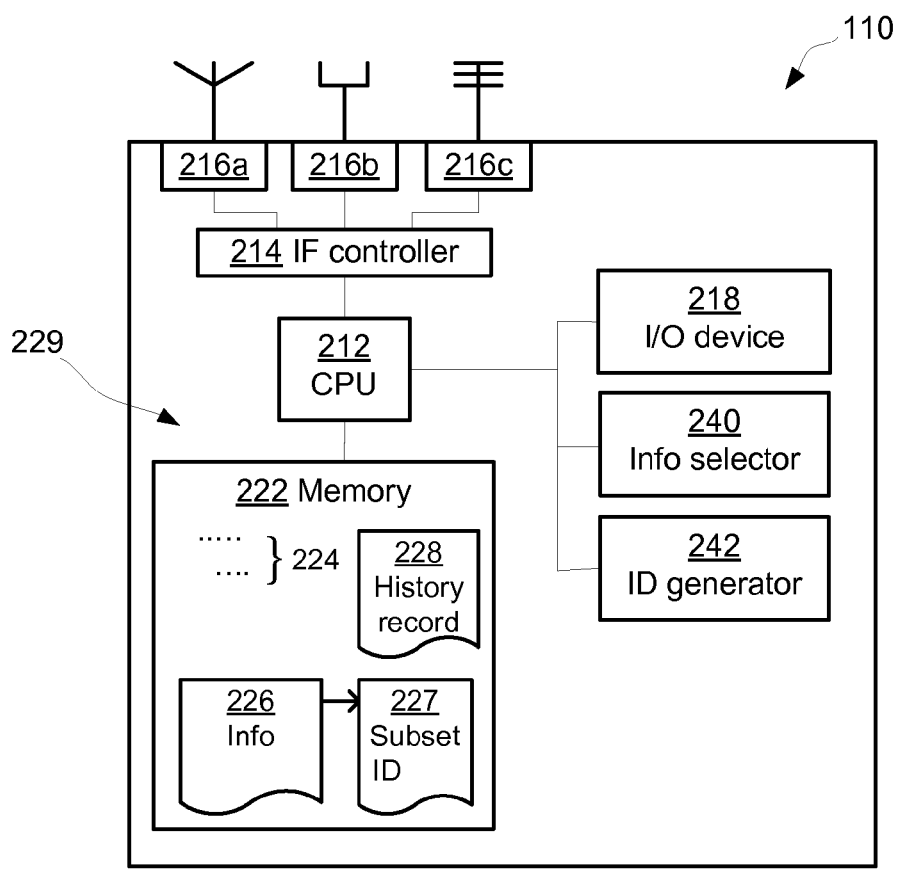
FIG. 2 illustrates a user equipment used in the system of FIG. 1.

With reference to FIG. 2, the (first) UE 110 is illustrated in further detail and comprises a central processing unit (CPU) 212 that is connected to a communication interface controller (IF controller) 214 which in turn controls communication interfaces like a GSM or LTE interface 216a, an interface 216b implementing one of the IEEE 802 wireless communication protocols and any other communications interface 216c configured for wireless communication, either direct with other UEs or with UEs via a base station. The interface controller 214 regularly listens to messages from other UEs requesting e.g. personal user information stored in the UE 110.

A memory unit (Memory) 222, which, for example, may be in the form of a flash memory, a hard disk, an EEPROM (Electronically Erasable Programmable Read-only Memory), is connected to the processing unit 212 and a computer program 224 having software instructions implementing one or more software applications are stored on the memory unit 222. Here one of these software applications is an application that implements functionality for selecting and sharing personal user information (Info) 226 stored in and associated with the UE 110. From the personal user information 226 a subset (Subset) 227 of the personal user information 226 can be retrieved as a function of a history record 228 that is also stored in the memory unit 222. In combination the computer program 224 and the memory unit forms a computer program product 229. In other embodiment the computer program product could be a disc, such as a CD or DVD on which the computer program product 224 is stored.

Incorporated in the UE 110 is also an input-output device (I/O device) 218 such as a keyboard in combination with a display or touch screen that allows both user input and display of information. An information selector (Info selector) 240 that can select the subset 226 of personal user information from the personal user information 227 is also connected to the processor 212, as well as an identifier generator (ID generator) 242 capable of generating an identifier (ID) of any of the subset 226 of personal user information, a question generated by the user 120 of the UE 110 and the UE 110 per se.

Each of the information selector 240 and the identifier generator 242 can be implemented as software modules of the computer program 224 and stored as executable program code on the memory unit 222. In this case the information selector 240 and the identifier generator 242 can be executed on the central processing unit 212. Even if the whole computer program 224 is stored in one memory unit 222 in FIG. 2, a person skilled in the art understands that the computer programs, e.g. modules of the computer program, could be stored in different memory units within the UE. The history record 228 may e.g. be stored in a second memory unit (not shown) comprised in the UE 110.

Figure 3:
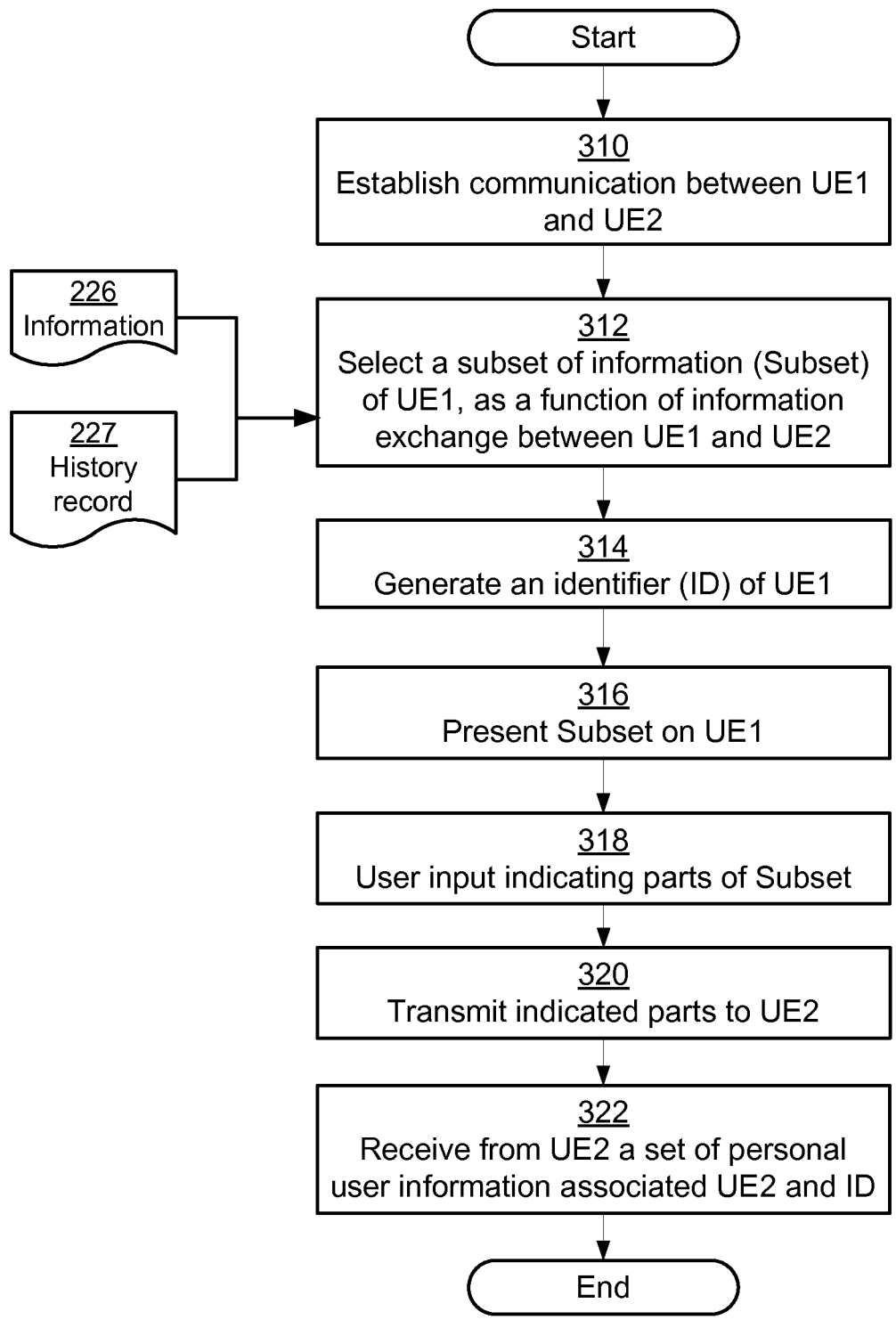
FIG. 3 is a flow diagram of an embodiment of the inventive method performed in the user equipment of FIG. 2.

With reference to FIG. 3 a flow chart illustrating a method of selecting and sharing the personal user information 226 associated with the UE 110 is shown, i.e. a method for performing the earlier described transactions. For the method as such, one or more of the steps may be performed in a different order than presented in the flow chart, one or more of the steps may be optionally performed, omitted, combined and/or divided into several steps.

In the first step 310, communication between the first UE 110 and the second UE 112 is established by using one of the communication interfaces 216a-216c, which is done by using known standards and protocols for the selected communication interface. Once communication is established the first UE 110 selects 312, by using the information selector 240, the subset 227 of the personal user information in accordance with the history record 228 containing information about a previous exchange of information between the UEs 110, 112.

Next a random and/or temporary identifier ID is generated 314 by the ID generator 242. This identifier is associated with the subset 227 of the personal user information for purpose of identifying the subset 227 and to which UE it was stored in, i.e. to which user the subset belongs to. Also, when a user wishes to ask a question to other mobile users in a vicinity, the ID generator 242 creates the ID as a randomly generated pseudonym to uniquely identify the question. This type of identification has the same function as a source address in data communications, i.e. to uniquely identify the sender. The pseudonym can be generated by a cryptographically secure SHA (Secure Hash Algorithm) function such as SHA-1 or Message-Digest algorithm 5. The ID generator 242 includes a sufficient amount of randomness to ensure that the ID selection is practically collision-free.

In the next step the subset 227 of the personal user information is presented 316 on the UE 110, and the UE then receives 318 a user input indicating parts of the subset 227 of the personal user information to be transmitted 320 to the second UE 112. Also, the user can select a number of questions to be sent to the second UE 112.

Finally, the subset 227 of the personal user information is transmitted 320 to the responding UE 112 and, assuming a user of the second UE responds, a response from the second UE 112 is received 322, where the response comprises a set of personal user information associated with the second UE 112 and the transmitted identifier ID, such that the response may be associated with the proper question/subset of information.

The information selector 240 is implemented to select parts of the personal user information 226 on basis of the history record 228. In more detail, the user information 226 can be structured as follows:

As can be seen in table A, the personal information comprises data where Type is a classification and Subtype is a subclass of Type. Typically both Type and Subtype are specified, either by a vendor of the first UE 110 and the modules used therein or by the user 120 of the first UE 110. Then the user 120 can assign personal information, Info (one piece of information) to a desired Type and/or Subtype. A privacy classification, Privacy, can also be included where, for example, "A" indicates highly sensitive information, "B" indicates moderately sensitive information while C indicates that the information is not sensitive. The privacy values can be assigned and modified by the user 120.

Received_from indicates whether another user 122 has sent the corresponding information about himself to the first UE 110 holding the personal information. For example, in table 1 a user 122 of the second UE (UE_2) 112 has shared information about his residential address. In a corresponding manner Sent_to indicates if the user 120 has sent the related information to the user 122 of the second UE (UE_2) 112. Here, UE_2 is a unique identifier generated e.g. as the previously mentioned ID, that allows the second UE 112 to be identified.

In table A a basic form of the history record is also included, where it, as can bee seen, comprises information indicating e.g. that the user 120 has sent to the second UE 112 information telling that he is running 2 days every week (for this information Sent_to has a value of UE_2, indicating that the information has been sent to the second UE 112). The history record also includes information indicating that the second UE has sent information about his home address to the first UE (for this information Received_from has a value of UE_2, indicating that the information has been received form the second UE 112). Even though not shown, it is possible to include the information that was received from the second UE 112, e.g. what rock favorite (artist) the second user 122 has. Oppositely it is possible to implement a more simple history record, such as only counting the number of times information is received from the second UE 112.

Even though the personal information and the history record in table A are shown as one data-structure, these two entities can be entirely separated and implemented as two different data objects, as it is only a matter of structuring and linking data, implying that the personal information and the history record may be structured according to other embodiments which includes omitting any subtypes, introducing subtypes to the subtypes, including additional fields for certain types of information etc.

In more detail, the information selector 240 implements rules for selecting parts of the personal user information 226

TABLE A

| Type | Subtype | Info | Privacy | Received_from | Sent_to |
|---|---|---|---|---|---|
| Sports | Running | 2 days/week | C | | UE_2 |
| Sports | Golf | Beginner | B | | |
| Sports | Swimming | As young | C | | |
| Music | Pop | Madonna concert 2007 | C | | |
| Music | Rock-favorite | Springsteen | C | UE_2 | UE_2 |
| Books | Sci-Fi | On the Beach | C | | UE_2 |
| Politics | Party | Voted "The Green Party" | B | | |
| Personal | Residential town | STOCKHOLM | C | | UE_2 |
| Personal | Residential address | Torshamnsg. 23 | A | UE_2 | | based on the history record 228. This can be implemented in various ways, for example by calculating a probability that each set of user information shall be sent to the second UE 112. When implementing the probability calculation, values of Type, Subtype, and Received_from can be used to apply a weight value to a base-probability (Base_value) indicating the probability that the information will be sent to the second user 122.

For example, the probability of the user sending his personal home address to another user can be 100% (Base_value)×0.90 (weight when Type is "Personal")×0.70 (weight when Subtype is "Residential address")× 0.20 (weight when Privacy is "A")×1.00 (weight when Received_from indicates that corresponding information has been received)=12.6%. Of course, it is possible to omit the weighting of Privacy by modifying the weight of e.g. Subtype or any other variable assigned a weight value. In any case, the information selector 240 can use a weight values associated with one or several of the attributes of the personal information.

As a further example, using the information of Table A, the probability of the user sending information telling that he was swimming as young can be 100% (Base_value)×1.00 (weight when Type is "Sports")×0.90 (weight when Subtype is "Swimming")×1.00 (weight when Privacy is "C")×0.75 (weight value if Received_from indicates that corresponding information has not been received)=67.5%. Exactly which weight factor to apply in each case can be set by an operator or a user in accordance with general or personal preferences.

For allowing a user to affect all information, a general variable, Gen_var, is implemented and is adjustable by a user. Gen_var can then comprise a percentage value that is variable by the user who can set it to a value between 0% and 100%. Gen_var is then subtracted from the calculated probability of the user sending information. For example, using the example above and if Gen_var is 20%, the probability of the user sending information telling that he was swimming as young would be 67.5%–20%=47.5%. If the subtraction of Gen_var results in a negative value the information will not be sent at all. Typically, Gen_var is set by adjusting a slider bar as described below, where the relative location of the slider bar determines the value of Gen_var.

Several Gen_var-values can be set by a user, where different Gen_var-values are associated with and applied for the information exchange with one or more different, responding users. Also, in one implementation Gen_var can be a negative value such that the subtraction of Gen_var results in an increased probability that certain information will be sent.

Once probability calculations are done for all pieces of personal user information (Info), a random number from 0% to 100% is generated for each piece of information. If the randomly generated number for a piece of information has a value below the calculated probability, it is determined that the particular piece of information is "selectable" for transmission to the second UE 112.

To avoid including to much information in the subset 227 of personal user information, a predefined number of (e.g. four) pieces of information are selected from the pieces of information that was determined as "selectable". This second selection can in turn be based on randomly selecting the predefined number of pieces of information from the "selectable" pieces of information. Before sending the information to the second UE 112, the finally selected pieces of information can be presented by the I/O device 218 in a user selectable format. Such a format can be a list of the information that can be sent, were the user can manually select which information to actually send to the second UE 112. It is also possible to omit the user selection by replacing it by a random selection, i.e. by a random selection of the above described "finally selected pieces of information".

Software modules for presenting selectable information and confirming the selection are known within the field of UE-interfaces and can be used as suitable for the specific model of UE that implements the described method. In a similar manner, a conventional graphical slider bar module can be implemented for defining a weight value for any of the attributes described above, and in particular for changing the value of Gen_var. Hence, by moving the slider bar graphically displayed by UE 112, for example with a graphical cursor of the UE, the weight value(s) can be changed.

The information selector 240 may also take a question received from the second UE 112 into account when deciding which information can that can be sent to the questioning UE 112. In this case the question can hold information about Type and Subtype, and the probability of the user 120 answering the question by sending the questioned information can be the probability as calculated above added by an absolute percentage value such as 30%. In this case, if the percentage value exceeds 100% the questioned information can be automatically included in the list of information to be presented for the earlier described manual user selection.

As the skilled person realizes, other techniques and methods may be used for determining which information can be selected for possible transmission to another user, and which information to be actually transmitted to and accordingly revealed for the other user. For example can decreasing trust be implemented as an increase of Gen_var, where a Gen_var-value of 100% results in no information being transmitted at all. Applying Gen_var in this manner can include determining a difference in pieces of information with a Privacy class of "A" a user has exchanged with another user. If the difference is positive, i.e. the user has sent more class "A" information than received, Gen_var is increased with the difference times e.g. 3%, i.e. trust is decreased following the example above. On the other hand, if the difference is negative, i.e. the user has sent less class "A" information than received, Gen_var is decreased with the difference times e.g. 3%, i.e. trust is increased.

One such example of successively revealing more private information (low chance of being transmitted to other UEs) can be based on Tit-for-Tat (TfT), which is explained below, including numerous variations thereof. Tit-for-Tat is used successfully in the Bit Torrent file-sharing protocol and has its theoretical roots in effective solutions for the so called "Prisoner's Dilemma". In order to move automatically between different levels of trust, i.e. send more or less of information that are considered more personal, it is possible to use thresholds of hits (meaning a match between the interests of both users) and misses (a non-match between the interests of both users). When a threshold of hits or misses is reached, the another strategy can be used for revealing information.

The mentioned Tit-for-Tat is based on a game theory strategy originally developed for the iterative Prisoner's Dilemma which is a problem where two people need to decide whether to co-operate or behave selfishly for differing levels of reward. TfT initially co-operates and then responds in kind to the other person's strategy. That is, if the other person co-operates, then the strategy co-operates and if the other person behaves selfishly, then the strategy behaves selfishly.

When implementing a TfT based method in the first UE 110, "cooperation" means the sharing of information and "selfishness" is the non-sharing of information, and numerous variations of TfT can be applied, such as:

i) Tit-for-Tat, which is the basic version of the strategy, as outlined above.
ii) Tit-for-Tat with forgiveness, which is similar with i) except that the strategy will periodically "forgive", that is, co-operate spontaneously with another person who did not co-operate previously. This approach gives a chance to other people who initially did not cooperate and also avoids spiraling circles of selfish behavior because nobody can co-operate as per the default TfT behavior.
iii) Tit-for-two-tat, where the reward (personal information) given to another person increases when co-operating behavior is observed.
iv) Tit-for-two-tat with forgiveness, which is based on iii) with the extension of allowing initially non-cooperating clients an opportunity to co-operate.

Rules for gradually sending information that is more personal can in the TfT-case be based on randomness, which can be the default strategy for replying to generic queries such as "what bands do you like?", or for replying to specific queries which fail to match the user's preferences. This rule can result in a randomized subset of up to 20% from the user's list of a certain type of information. Typically the user replies with only one piece of information, randomly selected from a random 20% of the user's personal information.

The rule can also be a "Tit-for-Tat"-rule, which is a default strategy for dealing with specific queries such as "does anybody like The Doors?" when there is a match with the user's tastes. This strategy can reply with a randomized subset of 40% from the user's list of bands, in this case. A reply could be: "I like The Doors, I also like Deep Purple". This strategy can persist for one round where one round consists of three successful interactions, i.e., no specific questions with misses.

The rule can also be a "Tit-for-Tat with forgiveness", which is the same as the previous rule except that this rule enables forgiveness of specific question with a miss instead of immediately downgrading to the random strategy. This strategy can reply with a randomized subset from 60% of the user's information. This strategy can persists for 1 round. Forgiveness strategies can be useful for branching into different areas. For example, if the conversation has only concerned music, a forgiveness strategy may help if the conversation switches to another subject for which there are misses.

The rule can also be a "Tit-for-two-Tat", where a query is answered twice in order to increase the amount of information available to the person making the query. This strategy can reply with a randomized subset from 80% of the user's information. This strategy persists for one round.

Finally, the rule can also be a "Tit-for-two-Tat with forgiveness", which is the same as the above rule except that if there is a query with a miss, the strategy does not immediately downgrade to use a "Tit-for-two-Tat". This rule can result in a reply with up to 100% of the user's information. This strategy can persist for one round or until the user decides to add the other user as a friend, thereby establishing the highest level of trust.

The communication set up between UEs can as indicated be based on client to client (UE to UE) communication in a peer-to-peer configuration, for example when the communication interface 216b based one of the IEEE 802 wireless communication protocols is used. In this case there is a broadcast primitive available which obviates the need for e.g. a relay server in a remote network. In this configuration, once a question has been formulated and a pseudonym has been attached to the message, the message is broadcasted on the local network. The message is received by other UEs also listening to the same wireless network.

In situations where additional anonymity is required, it is possible to use other nodes of the local network as Chaum mixes which randomly rebroadcast messages to further obscure their origins. Also, in this peer-to-peer case, the network identifier used for contacting the originator of the question will typically be the Media Access Control address of the originator (or a node of the Chaum mix network).

Actions performed when submitting a question can include i), in a UE, receive a question from a questioning UE, ii) randomly generate an identifier by using the identifier generator 242 and associating the identifier with the question, iii) processing the question in the information selector 240 of the UE where it is decided what information shall be revealed, iv) associating the information with the identifier, and vi), sending the information to the questioning UE. In this case, depending on what calculations are done in the information selector 240, it is more or less likely that the question will really be answered.

The communication set up between UEs 110, 112 can also be based on communication via the long range GSM/LTE communication interface 216a. In this case there is no local or link-layer broadcast as in the peer-to-peer configuration above. In order to utilize long range communication the relay server 116 is used to keep track of the UEs 110, 112 of and their locations. When a question is sent by a user with an attached pseudonym, an area is specified by the relay server 116, defining what is "near" the user, for example by using a coordinate system. The coordinate system can in this case be a positioning system utilizing geographical coordinates, such as a Global Positioning System (GPS), but it could be a network cell-ID-system or triangulation system or any mixture thereof. If GPS is used the UE 110 comprises a GPS receiver for generation and transmitting the coordinates to the relay server 116. In case a cell-ID or triangulation system is used the relay server 116 can determine a position of the UE 110 according to methods known within the art, such as by using e.g. the Ericsson MPS (Mobile Positioning System) product.

The relay server 116 then analyzes the locations of the attached users and calculates which users meet the criteria of being "near", which in a general case can be within an area of be 8 kilometers from the questioning UE. The user's question is then sent via unicast transmission to the other UEs which meet the criteria of being "near". When a reply is to be sent back to the UE, the responding UE goes through the process of selecting a pseudonym and then sending the information to the relay server 116 for forwarding to the originator of the question. The network identifier used for contacting the originator of the question will typically be the IP address of the originator.

Of course, the UEs described herein are in addition implemented according to known standards and protocols within the field of mobile communication and networking. In fact, the invention may be implemented on conventional UEs commercially available today. Then it is only a matter of implementing software instructions which when run in the UE perform the above described method of processing user information.

Software instructions, i.e. a computer program code for carrying out methods performed in the previously discussed system may for development convenience be written in a high-level programming language such as Java, C, and/or C++ but also in other programming languages, such as, but not limited to, interpreted languages. Some modules or routines may be written in assembly language or even microcode to enhance performance and/or memory usage. It will be further appreciated that the functionality of any or all of the functional steps of the method may also be implemented using discrete hardware components, one or more application specific integrated circuits, or a programmed digital signal processor or microcontroller.

Although various embodiments of the invention have been described and shown, the invention is not restricted thereto, but may also be embodied in other ways within the scope of the subject-matter defined by the above described method. In particular, the invention may be implemented by using other techniques for selecting exactly which information shall be sent to another UE.

In one application which comprises/enables an aspect of the invention, such as the claimed method, the method could be utilized in an initial pre-chat mode/interface before the communicating users have decided to trust one another. Once they trust each other, the can switch to another communication mode comprised in the application where the other communication mode is configured based on an assumption that the users trust and/or know the true identity of each other.

The invention claimed is:

1. A method of selecting and sharing personal user information associated with a user equipment, the method performed by the user equipment and comprising the steps of:
    establishing communication with a responding user equipment;
    selecting a subset of the personal user information, based on a history record that identifies an amount of personal user information stored in the user equipment that was previously transmitted to the responding user equipment;
    generating a temporary or random identifier of the user equipment, wherein the temporary or random identifier conceals an actual identity of the user equipment;
    presenting on the user equipment the subset of the personal user information;
    receiving a user input indicating a user's selection of parts of the subset of the personal user information to be transmitted to the responding user equipment; and
    transmitting the parts of the subset of the personal user information and the temporary or random identifier of the user equipment to the responding user equipment, wherein the transmitted temporary or random identifier is associated with the transmitted parts of the subset of personal user information,
    wherein the selecting of the subset of the personal user information comprises randomly selecting at least a part of the subset as a function of a type-classification of the personal user information to provide privacy based on a cryptographically secure function,
    wherein the cryptographically secure function is applied to the subset of the personal user information to randomly select at least the part of the subset of personal user information, and
    wherein the type-classification indicates a category to which the personal user information belongs.

2. A method according to claim 1, wherein the history record comprises information about a type of personal user information previously transmitted from the responding user equipment to the user equipment and associated with the responding user equipment.

3. A method according to claim 1, further comprising:
    increasing the subset of personal user information in response to an indication of an increase of personal user information mutually exchanged between the user equipment and the responding user equipment.

4. A method according to claim 1, wherein the selecting of the subset of the personal user information comprises randomly selecting at least a part of the subset of the personal user information.

5. A method according to claim 4, wherein the randomly selected part of the subset of personal user information is decreased as a function of the history record.

6. A method according to claim 1, wherein the selecting of the subset of the personal user information comprises selecting at least a part of the subset as a function of a privacy-classification of the personal user information.

7. A method according to claim 1, wherein the personal user information associated with the user equipment is stored in the user equipment.

8. A method according to claim 1, comprising receiving a response from the receiving user equipment, the response comprising a set of personal user information associated with the receiving user equipment and the transmitted temporary or random identifier.

9. A method according to claim 1, wherein the personal user information stored in the user equipment that was previously transmitted comprises information identifying which specific user equipment a transmission was sent to or received from, when a transmission occurred, and/or a frequency of transmission.

10. A method according to claim 1, wherein the amount of personal user information comprises an amount of data, a number of transmissions over a period of time, and/or a rate of a data stream.

11. A method according to claim 10, wherein the amount of personal user information is based on the history record of personal user information that was previously transmitted and is used to determine the subset of the personal user information presented on the user equipment based on a privacy-classification of the personal user information.

12. A user equipment configured to select and share personal user information associated with the user equipment, the user equipment comprising:
    a communication interface controller configured for establishing communication with a responding user equipment;
    an information selector configured for:
        selecting a subset of the personal user information, based on a history record that identifies an amount of personal user information stored in the user equipment that was previously transmitted to the responding user equipment, and
        presenting on the user equipment the subset of the personal user information, and receiving a user input indicating a user's selection of parts of the subset of the personal user information to be transmitted to the responding user equipment;
    an identifier generator configured for generating a temporary or random identifier of the user equipment, wherein the temporary or random identifier conceals an actual identity of the user equipment,
    wherein the communication interface controller is further configured for transmitting the parts of the subset of the personal user information and the temporary or random identifier of the user equipment to the responding user equipment, wherein the transmitted temporary or random identifier is associated with the transmitted parts of the subset of personal user information,
    wherein the selecting of the subset of the personal user information comprises randomly selecting at least a part of the subset as a function of a type-classification of the personal user information to provide privacy based on a cryptographically secure function, wherein the cryptographically secure function is applied to the subset of the personal user information to randomly select at least the part of the subset of personal user information, and wherein the type-classification indicates a category to which the personal user information belongs.

13. A computer program product on a tangible non-transitory computer readable storage medium and configured for selecting and sharing personal user information associated with a user equipment, the computer program product containing computer code which when run on the user equipment causes the user equipment to:

establish communication with a responding user equipment;

select a subset of the personal user information, based on a history record that identifies an amount of personal user information stored in the user equipment that was previously transmitted to the responding user equipment;

generate a temporary or random identifier of the user equipment, wherein the temporary or random identifier conceals an actual identity of the user equipment;

present on the user equipment the subset of the personal user information;

receive a user input indicating a user's selection of parts of the subset of the personal user information to be transmitted to the responding user equipment; and transmit the parts of the subset of the personal user information and the temporary or random identifier of the user equipment to the responding user equipment, wherein the transmitted temporary or random identifier is associated with the transmitted parts of the subset of personal user information, wherein the information selector randomly selects at least a part of the subset as a function of a type-classification of the personal user information to provide privacy based on a cryptographically secure function, wherein the cryptographically secure function is applied to the subset of the personal user information to randomly select at least the part of the subset of personal user information, and wherein the type-classification indicates a category to which the personal user information belongs.

14. The user equipment of claim 12, wherein:
the history record comprises information about a type of personal user information previously transmitted from the responding user equipment to the user equipment and associated with the responding user equipment.

15. The user equipment of claim 12, wherein:
the information selector is configured to select at least a part of the subset as a function of a privacy-classification of the personal user information.

16. A method according to claim 12, wherein the personal user information stored in the user equipment that was previously transmitted comprises information identifying which specific user equipment a transmission was sent to or received from, when a transmission occurred, and/or a frequency of transmission.

17. A method according to claim 12, wherein the amount of personal user information comprises an amount of data, a number of transmissions over a period of time, and/or a rate of a data stream.

18. A method according to claim 17, wherein the amount of personal user information is based on the history record of personal user information that was previously transmitted and is used to determine the subset of the personal user information presented on the user equipment based on a privacy-classification of the personal user information.

* * * * *